United States Patent
Cho

(10) Patent No.: US 12,235,750 B2
(45) Date of Patent: Feb. 25, 2025

(54) METHOD FOR PROTECTING APPLICATION STACKS

(71) Applicant: HYUNDAI AUTOEVER CORP., Seoul (KR)

(72) Inventor: Jun-Ho Cho, Seoul (KR)

(73) Assignee: HYUNDAI AUTOEVER CORP., Seoul (KR)

( * ) Notice: Subject to any disclaimer, the term of this patent is extended or adjusted under 35 U.S.C. 154(b) by 33 days.

(21) Appl. No.: 18/076,948

(22) Filed: Dec. 7, 2022

(65) Prior Publication Data
US 2023/0185697 A1 Jun. 15, 2023

(30) Foreign Application Priority Data
Dec. 9, 2021 (KR) .................. 10-2021-0175707

(51) Int. Cl.
*G06F 11/00* (2006.01)
*G06F 11/362* (2025.01)

(52) U.S. Cl.
CPC .................. *G06F 11/366* (2013.01)

(58) Field of Classification Search
CPC ...................................... G06F 11/366
See application file for complete search history.

(56) References Cited

U.S. PATENT DOCUMENTS

| 10,120,745 | B2 * | 11/2018 | Duvalsaint | G06F 9/30076 |
| 11,256,561 | B1 * | 2/2022 | Keller | G06F 12/0684 |
| 2006/0095895 | A1 * | 5/2006 | K. | G06F 11/3644 714/E11.178 |
| 2010/0153677 | A1 * | 6/2010 | Kim | G06F 9/5016 711/170 |
| 2013/0013965 | A1 * | 1/2013 | Guillemin | G06F 21/52 714/48 |
| 2015/0150024 | A1 * | 5/2015 | Grossi | G06F 9/30134 718/107 |
| 2015/0220464 | A1 * | 8/2015 | Heisswolf | G06F 12/1441 710/267 |
| 2016/0028767 | A1 * | 1/2016 | Ripoll | G06F 21/52 726/23 |
| 2019/0108085 | A1 * | 4/2019 | Gschwind | G06F 11/073 |
| 2020/0133713 | A1 * | 4/2020 | Liu | G06F 11/07 |

FOREIGN PATENT DOCUMENTS

KR 20130060984 A 6/2013

* cited by examiner

*Primary Examiner* — Amine Riad
(74) *Attorney, Agent, or Firm* — Lempia Summerfield Katz LLC

(57) ABSTRACT

Disclosed herein is a method for protecting application stacks. In particular, the method includes: designating, by an operating system (OS) module, an additional stack dummy to an application stack in connection with a micro control unit (MCU); generating, by the MCU, an interrupt by recognizing, through the stack dummy, whether the application stack overflows; and performing, by the OS module, a measure of protection for the overflowed application stack according to whether the interrupt is generated.

9 Claims, 6 Drawing Sheets

FIG.5

| APPLICATION INFORMATION | USE CONTEXT | NOTE |
|---|---|---|
| APPLICATION 0 | Task0, Task1, ISR0 | USE OF APPLICATION STACK0 |
| APPLICATION 1 | Task2, Task3, ISR1, ISR2 | USE OF APPLICATION STACK1 |

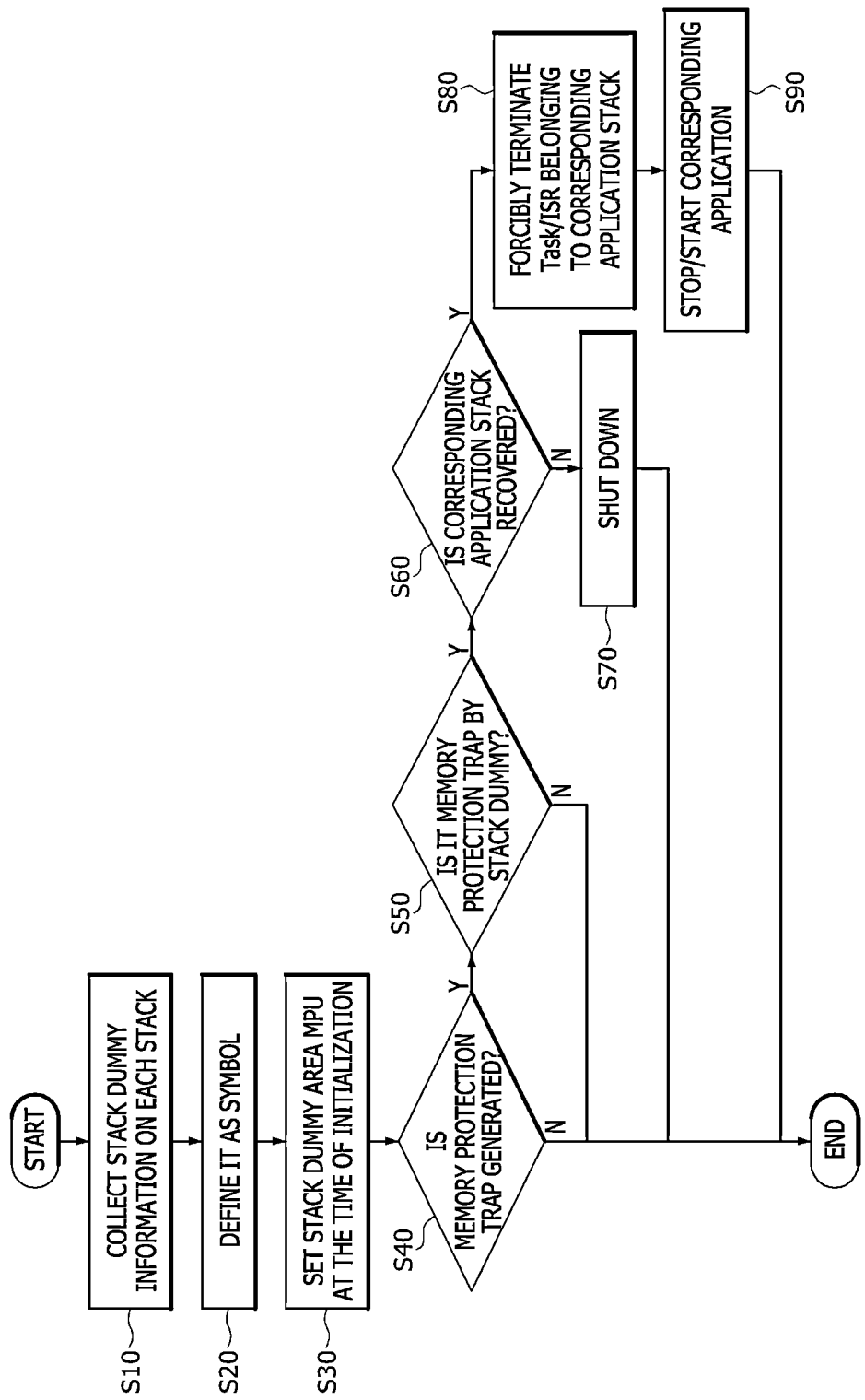

METHOD FOR PROTECTING APPLICATION STACKS

CROSS-REFERENCE TO RELATED APPLICATION

This application claims priority to and the benefit of Korean Patent Application No. 10-2021-0175707, filed on Dec. 9, 2021, the entire contents of which are incorporated herein by reference.

FIELD

The present disclosure relates to a method for protecting application stacks, and more particularly, to a method for protecting application stacks by designating a stack dummy for each application stack and checking whether each application stack overflows based on the stack dummy.

BACKGROUND

The statements in this section merely provide background information related to the present disclosure and may not constitute prior art.

Typically, an in-vehicle electronic control device performs an operation of allocating and releasing a RAM storage space to execute each type of software. During such an operation, it may be necessary to temporarily store predetermined data in a memory by a certain signal or command. For this purpose, a stack area is designated on the memory for temporary storage.

Meanwhile, the term "stack overflow" refers to a phenomenon in which a specific task uses all of the stacks assigned to it and invades memory areas that are not assigned to it to store its own information.

Even if an application stack overflows, it may not cause a problem depending on the before and after memory maps. It may also be difficult for a user to recognize the problem caused by the stack because the compiler determines how to pile the stack.

In other words, even though the stack overflow causes a problem, a situation may arise in which the cause of the problem is not known or whether the problem has occurred because the RAM portion of the corresponding area is not used.

However, this is potentially problematic and may have a major impact on the system later.

SUMMARY

Various embodiments are directed to a method for protecting application stacks by designating a stack dummy for each application stack and checking whether each application stack overflows based on the stack dummy to shut down a micro control unit (MCU) or recover that application stack according to the result of the check.

In an embodiment of the present disclosure, a method for protecting application stacks includes: designating, by an operating system (OS) module, an additional stack dummy to an application stack in connection with a micro control unit (MCU); generating, by the MCU, an interrupt by recognizing, through the stack dummy, whether the application stack overflows; and performing, by the OS module, a measure of protection for the overflowed application stack according to whether the interrupt is generated.

In one embodiment, designating, by the operating system (OS) module, an additional stack dummy may include: designating, by the OS module, the application stack through a compiler; designating, by the OS module, a stack dummy area in the application stack based on the symbol of the application stack; and designating, by the OS module, a stack dummy symbol for the stack dummy area.

In one embodiment, generating, by the MCU, an interrupt may include: activating, by the OS module, a memory protection unit (MPU) function for each stack dummy; generating, by the MCU, a memory protection trap according to whether the application stack overflows; and checking, by an interrupt handler, the overflowed application stack. In particular, the interrupt handler is called by the OS module when the memory protection trap is generated.

In activating, by the OS module, a memory protection unit (MPU) function, the OS module may place the stack dummy in an MPU area and enable the MPU area.

Through checking, by the interrupt handler, the overflowed application stack, the overflowed application stack is detected by checking an area of which one of stack dummy symbols the memory protection trap is generated.

The checking of the overflowed application stack may check whether the application stack overflows or whether which one of multiple application stacks overflows.

The performing of the measure of protection for the overflowed application stack may include selectively performing the measure of protection upon user request.

The selectively performing of the measure of protection may include shutting down the MCU.

The selectively performing of the measure of protection may include recovering the application stack.

The selectively performing of the measure of protection may include forcibly terminating a context using the application stack and then restarting an application.

As apparent from the above description, the method for protecting application stacks according to the present disclosure designates a stack dummy for each application stack and checks whether each application stack overflows based on the stack dummy to shut down the MCU or recover that application stack according to the result of the check.

The method for protecting application stacks enables a user to recognize a stack overflow to take action on stack protection even if the stack overflow does not cause a problem, thereby preventing system failure due to the stack overflow that may occur in the future.

BRIEF DESCRIPTION OF THE DRAWINGS

In order that the disclosure may be well understood, there will now be described various forms thereof, given by way of example, reference being made to the accompanying drawings, in which:

FIG. 5 is a diagram illustrating an example of application stack recovery according to an embodiment of the present disclosure; and FIG. 6 is a flowchart illustrating a method for recovering application stacks according to an embodiment of the present disclosure.

DETAILED DESCRIPTION

Figure 1:
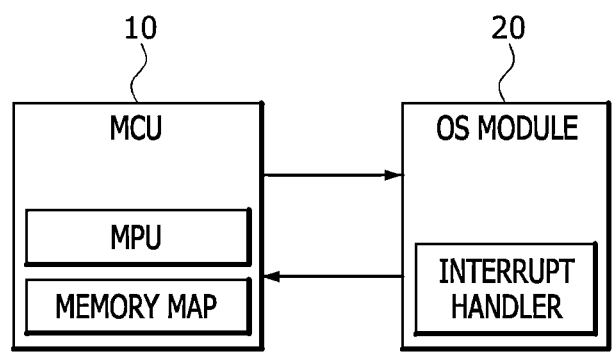
FIG. 1 is a block diagram illustrating an apparatus for protecting application stacks according to an embodiment of the present disclosure.

Hereinafter, a method for protecting application stacks according to an embodiment of the present disclosure is described in detail with reference to the accompanying drawings. It should be considered that the thickness of each line or the size of each component in the drawings may be exaggeratedly illustrated for clarity and convenience of description. In addition, the terms as used herein are defined in consideration of functions of the present disclosure, and these terms may change depending on the intention or practice of a user or an operator. Therefore, these terms should be defined based on the entirety of the disclosure set forth herein.

When a component, device, element, or the like of the present disclosure is described as having a purpose or performing an operation, function, or the like, the component, device, or element should be considered herein as being "configured to" meet that purpose or to perform that operation or function.

Also, the terms, such as 'unit' or 'module', etc., should be understood as a unit that processes at least one function or operation and that may be embodied in a hardware manner (e.g., a processor), a software manner, or a combination of the hardware manner and the software manner.

Figure 2:
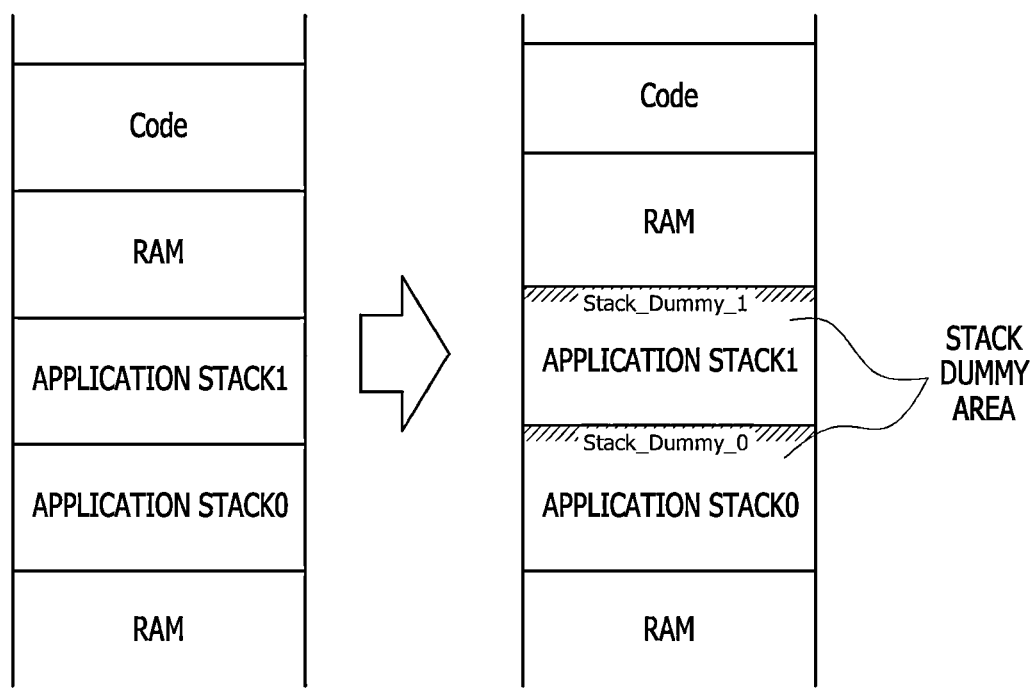
FIG. 2 is a diagram illustrating an example in which a dummy area is designated for each application stack according to an embodiment of the present disclosure.
Figure 3:
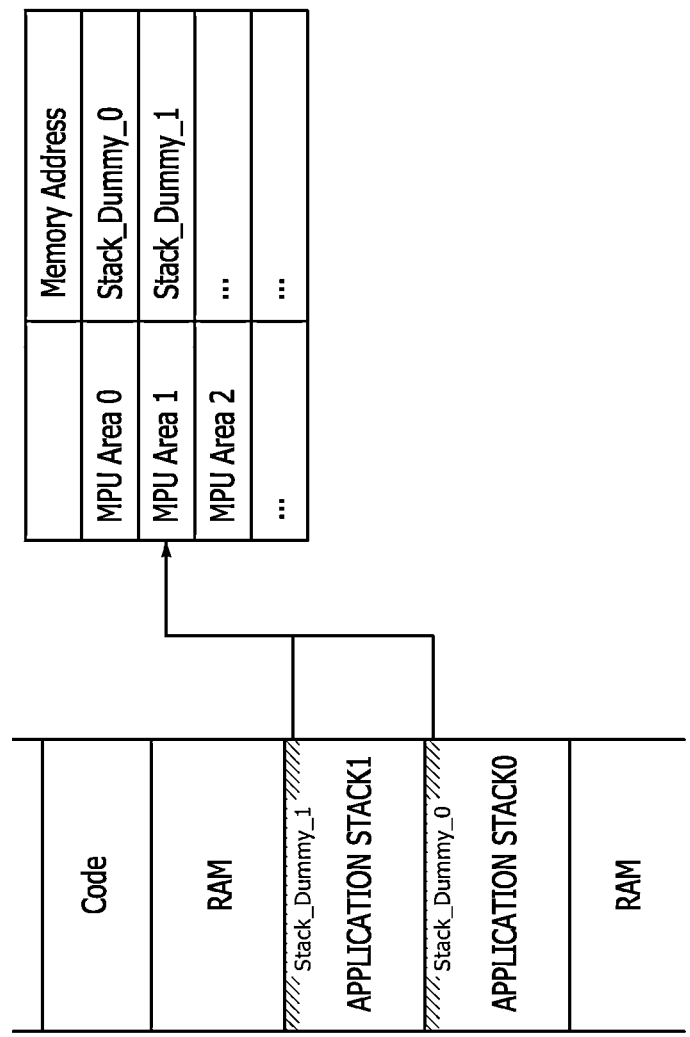
FIG. 3 is a diagram illustrating an example in which a dummy area is placed in an MPU area and the MPU is activated according to the embodiment of the present disclosure.
Figure 4:
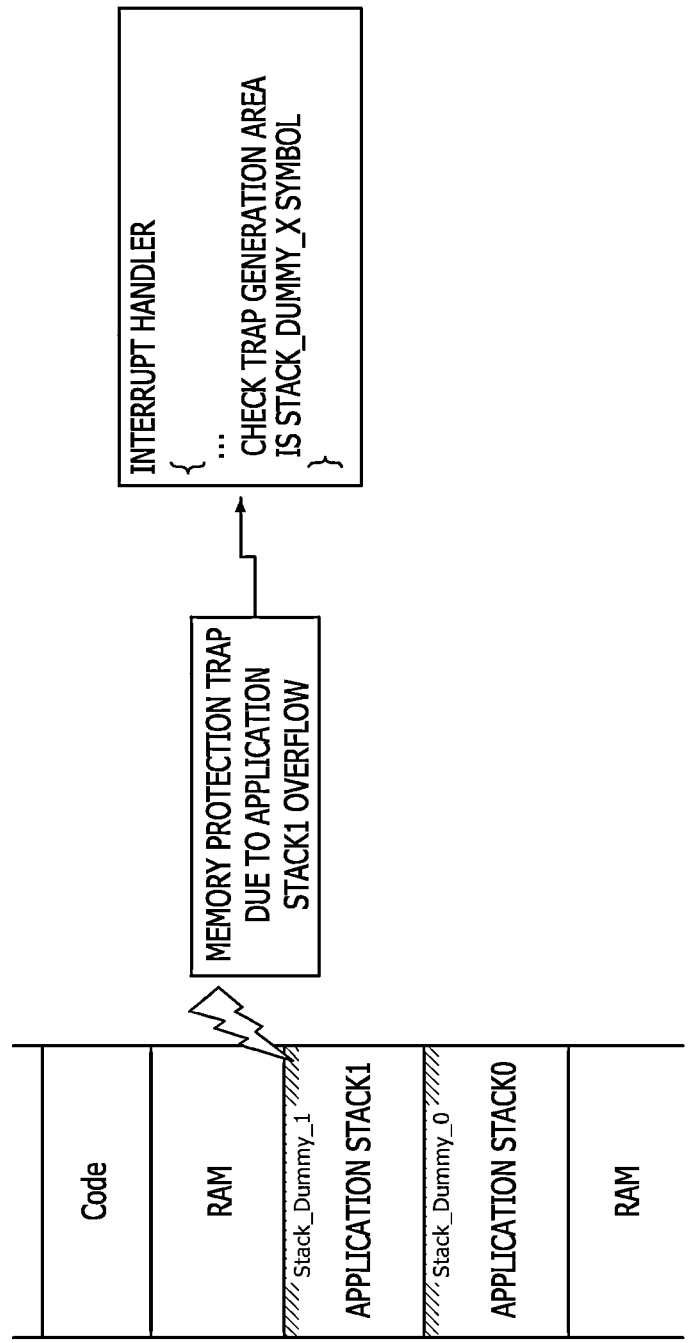
FIG. 4 is a diagram illustrating an example of stack overflow detection according to an embodiment of the present disclosure.

FIG. 1 is a block diagram illustrating an apparatus for protecting application stacks according to an embodiment of the present disclosure. FIG. 2 is a diagram illustrating an example in which a dummy area is designated for each application stack according to the embodiment of the present disclosure. FIG. 3 is a diagram illustrating an example in which a dummy area is placed in an MPU area and the MPU is activated according to the embodiment of the present disclosure. FIG. 4 is a diagram illustrating an example of stack overflow detection according to the embodiment of the present disclosure.

Referring to FIG. 1, the apparatus for protecting application stacks includes a micro control unit (MCU) 10 and an operating system (OS) module 20.

The OS module 20 designates an application stack through a compiler.

The compiler provides the OS module with information for designating an application stack area in a memory area inside the MCU 10. In this case, the compiler designates symbols such as Stack_Top and Stack_Bottom in the application stack area.

As the compiler designates the symbols such as Stack_Top and Stack_Bottom, the OS module 20 designates a stack dummy area to at least one of the symbols such as Stack_Top and Stack_Bottom.

Although the stack dummy area may be set in such a manner that a user directly designates a memory, it may also be designated through the symbol of the application stack as described above.

Referring to FIG. 2, the OS module 20 may designate the stack dummy area by adding a set byte to the Stack_Top and Stack_Bottom of the application stack.

For example, the OS module 20 may designate the stack dummy area in the form of Stack_Top+8 bytes or Stack_Bottom+8 bytes of the application stack.

As the stack dummy area is designated to the application stack, the OS module 20 defines the memory address value of the stack dummy area as a stack dummy symbol.

In this case, the OS module 20 collects stack information on each application stack and defines the memory address value of the corresponding stack dummy area as a stack dummy symbol.

FIG. 2 illustrates an example in which Stack_Dummy_1 is defined as a stack dummy symbol of Application Stack1 and Stack_Dummy_2 is defined as a stack dummy symbol of Application Stack2.

As the stack dummy area is designated, the OS module 20 transmits, to the MCU 10, the stack dummy information related to the stack dummy area.

In this case, the MCU 10 stores the stack dummy information received from the OS module 20, and designates a memory area in response to that stack dummy information.

Accordingly, as illustrated in FIG. 2, the Stack_Dummy_1 and the Stack_Dummy_2 may be designated to the respective Application Stack1 and Application Stack2 in the memory area inside the MCU 10.

As the stack dummy is designated to the application stack, the OS module 20 activates an MPU function in the MCU 10.

Referring to FIG. 3, the OS module 20 places a stack dummy in a MPU area at the time of initialization and enables a corresponding MPU.

In this case, the OS module 20 sets each MPU area at the time of initialization, allocates a corresponding memory address for each MPU area, and then enables the MPU area.

When the application stack overflows with the MPU area enabled, data of the stack dummy of the overflowed application stack is stored in the memory address of FIG. 3. Accordingly, the MCU 10 generates an interrupt.

In other words, when one of the application stacks overflows, the data of the stack dummy designated to that application stack is written to the memory address. In this case, the MCU 10 generates a memory protection trap according to the memory protection function.

This allows the OS module 20 to check whether the application stack overflows. If it is checked that the application stack overflows, it is possible to check which one of a plurality of application stacks overflows.

The MCU 10 generates a memory protection trap when the application stack overflows.

As the memory protection trap is generated, the OS module 20 calls an interrupt handler for that memory protection trap.

The interrupt handler may check which one of the application stacks overflows based on the previously stored information on the stack dummy symbol.

Referring to FIG. 4, as the MCU 10 generates a memory protection trap due to an overflow in the application stack, the interrupt handler checks the overflowed application stack using the stack dummy symbol.

In this case, the interrupt handler may detect the overflowed application stack by checking which stack dummy symbol's memory protection trap generation area is a memory protection trap generation area.

This allows the interrupt handler to check whether the application stack overflows. If the application stack overflows, it is possible to check which one of the application stacks overflows.

When the application stack overflows, the OS module 20 performs a measure of protection for the application stack.

In this case, the OS module 20 may shut down the MCU 10 or recover the application stack upon user request.

In particular, when it is intended to recover the application stack, the OS module 20 may forcibly terminate a context using the application stack and then restart that application stack.

Referring to FIG. 5, when Application Stack1 overflows, the OS module 20 forcibly terminates all contexts Task2, Task3, ISR1, and ISR2 that use the application stack, together with Application1, and then restart that Application1.

Hereinafter, a method for recovering application stacks according to an embodiment of the present disclosure is described in detail with reference to FIG. 6.

FIG. 6 is a flowchart illustrating a method for recovering application stacks according to an embodiment of the present disclosure.

Referring to FIG. 6, a compiler of an OS module 20 designates an application stack area of a memory area inside an MCU 10.

In this case, the OS module 20 designates a stack dummy area to at least one of symbols such as Stack_Top and Stack_Bottom of the application stack designated by the compiler.

Next, the OS module 20 collects stack dummy information on each application stack and defines the memory address value of the corresponding stack dummy area as a stack dummy symbol (S10 and S20).

As the stack dummy area is designated, the OS module 20 transmits, to the MCU 10, the stack dummy information related to the stack dummy area. In this case, the MCU 10 stores the stack dummy information received from the OS module 20, and defines a memory area in response to that stack dummy information.

Next, the OS module 20 activates an MPU function at the time of initialization (S30). In this case, the OS module 20 may place a stack dummy in an MPU area and enable a corresponding MPU.

As the MPU is enabled, the OS module 20 checks whether a memory protection trap is generated in the MCU 10 (S40).

In this process, when the application stack overflows, data of the stack dummy corresponding to that application stack is stored in a memory address, so that the MCU 10 generates the memory protection trap.

As the memory protection trap is generated, the OS module 20 calls an interrupt handler for that memory protection trap.

The interrupt handler checks whether the memory protection trap is generated in the application stack based on the previously stored information on the stack dummy symbol (S50).

In other words, the interrupt handler checks which stack dummy symbol's memory protection trap generation area is a memory protection trap generation area If it is checked in step S50 that the memory protection trap is not generated in the stack dummy of the application stack, the process is terminated.

On the other hand, if it is checked in step S50 that the memory protection trap is generated in the stack dummy of the application stack, the OS module 20 checks to a user whether or not to recover the corresponding application stack area (S60).

If it is checked in step S60 that the user intends to shut down the MCU 10, the OS module 20 shuts down the MCU 10 according to the user's selection (S70).

On the other hand, if it is checked in step S60 that the user intends to recover the application stack, the OS module 20 forcibly terminates the context using that application stack, and then terminates an application. Then, the OS module 20 restarts that application.

As described above, the method for protecting application stacks according to the present disclosure designates a stack dummy for each application stack and checks whether each application stack overflows based on the stack dummy to shut down the MCU or recover that application stack according to the result of the check.

In addition, the method for protecting application stacks enables the user to recognize a stack overflow to take action on stack protection even if the stack overflow does not cause a problem, thereby preventing system failure due to the stack overflow that may occur in the future.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (e.g., an apparatus or program). The apparatus may be implemented in, for example, appropriate hardware, software, and firmware. The method may be implemented in, for example, an apparatus such as a processor, which refers to a processing device in general, including, for example, a computer, a microprocessor, an integrated circuit, or a programmable logic device. The processor also includes communication devices such as computers, cell phones, portable/personal digital assistants ("PDAs"), and other devices that facilitate communication of information between end-users.

While the present disclosure has been described with respect to the embodiments illustrated in the drawings, it will be obvious to those having ordinary skill in the art that such embodiments are provided by way of example only. It will be understood by those having ordinary skill in the art that various modifications and other equivalent embodiments may be made without departing from the spirit and scope of the present disclosure.

What is claimed is:

1. A method for protecting application stacks, comprising:
designating, by an operating system (OS) module, respective ones of one or more stack dummies to respective ones of one or more application stacks in connection with a micro control unit (MCU);
activating, by the OS module, a memory protection unit (MPU) for each stack dummy among the one or more stack dummies, wherein the MPU for each stack dummy is arranged in the MCU, and wherein activating the MPU for each stack dummy includes placing, by the OS module, the stack dummy in an MPU area and enabling, by the OS module, the MPU area;
generating, by the MCU, an interrupt by recognizing, through a particular stack dummy, among the one or more stack dummies, whether a particular application stack, among the one or more application stacks, in which the particular stack dummy is designated overflows; and
performing, by the OS module, a measure of protection for the overflowed application stack according to whether the interrupt is generated.

2. The method according to claim 1, wherein designating a stack dummy among the one or more stack dummies to an application stack among the one or more application stacks comprises:

designating, by the OS module, the application stack through a compiler;

designating, by the OS module, a stack dummy area in the application stack based on a symbol of the application stack; and designating, by the OS module, a stack dummy symbol for the stack dummy area.

3. The method according to claim 1, wherein generating the interrupt comprises:

generating, by the MCU, a memory protection trap according to whether the particular application stack overflows; and identifying, by an interrupt handler, the overflowed application stack, the interrupt handler being called by the OS module when the memory protection trap is generated.

4. The method according to claim 3, wherein identifying the overflowed application stack includes detecting the overflowed application stack by checking which stack dummy symbol's memory protection trap generation area is a memory protection trap generation area.

5. The method according to claim 3, wherein identifying the overflowed application stack includes checking whether the application stack overflows or whether which one of multiple application stacks overflows.

6. The method according to claim 1, wherein performing the measure of protection for the overflowed application stack comprises selectively performing the measure of protection upon user request.

7. The method according to claim 6, wherein selectively performing the measure of protection includes shutting down the MCU.

8. The method according to claim 6, wherein selectively performing the measure of protection includes recovering the particular application stack.

9. The method according to claim 8, wherein selectively performing the measure of protection includes forcibly terminating a context using the particular application stack and then restarting an application.

* * * * *